United States Patent [19]

Chiueh et al.

[11] Patent Number: 5,742,741
[45] Date of Patent: Apr. 21, 1998

[54] RECONFIGURABLE NEURAL NETWORK

[75] Inventors: Tzi-Dar Chiueh, Taipei; Hwai-Tsu Chang; Yeh-Rong Hsu, both of Hsinchu; Huang-Lin Yang, Taipei; Chung-Chih Chang, Doou-Liou City, all of Taiwan

[73] Assignee: Industrial Technology Research Institute, Hsinchu, Taiwan

[21] Appl. No.: 683,254

[22] Filed: Jul. 18, 1996

[51] Int. Cl.$^6$ ........................... G06F 15/18
[52] U.S. Cl. ........................... 395/27; 395/24
[58] Field of Search ................ 395/891, 24, 27

[56] References Cited

U.S. PATENT DOCUMENTS

| | | | |
|---|---|---|---|
| 4,326,259 | 4/1982 | Cooper et al. | 395/24 |
| 5,093,900 | 3/1992 | Graf | 395/24 |
| 5,155,802 | 10/1992 | Mueller | 395/11 |
| 5,216,751 | 6/1993 | Gardner et al. | 395/27 |
| 5,533,169 | 7/1996 | Burnod | 395/27 |

OTHER PUBLICATIONS

"80170NX Electrically Trainable Analog Neural Network", Intel Co Menu, pp. 1–42, (1993).
Boser, Bernhard E., et al., "An Analog Neural Network Processor wit Programmable Topology", *IEEE Journal of Solid-State Cirucits* vol. 26, No. 12, pp. 2017–2025, (Dec. 1991).
Hammerstrom, Dan, "Working with Neural Networks", *IEEE Spectrum* pp. 46–53, (Jul. 1993).
Mees, Alistair I., et al., "Device Modeling by Radial Basis Functions" *IEEE Transactions on Circuits and Systems–I: Fundamental Theory and Applications*, vol. 39, No. 1, pp. 19–27, (Jan. 1992).
Wawrzynek, John et al., "The Design of a Neuro–Microprocessor" *IEEE Transactions on Neural Networks*, vol. 4, No. 3, pp. 394–399 May 1993.
Larsson–Edefors, "Optimising a high speed serial/parallel sum of products hardware structure with respect to bus utilisation," IEE Proceedings–Computers and digital techniques v142n1, Jan. 1995.
Dadda, Luigi and Breveglieri, Luca, "A serial–input serial–output bit–sliced convolver," Department of Electronics, Politecnico di Milano, Italy; IEEE pp. 490–495, May 1988.
Lee, Burnyoub and Chung, Duckjin, "A hardware implementation of neural network with modified HANNIBAL architecture," transactions of the Korean institute of electrical engineers, v45 n3, Mar. 1996.

*Primary Examiner*—Allen R. Macdonald
*Assistant Examiner*—Jeffrey S. Smith
*Attorney, Agent, or Firm*—Christensen, O'Connor, Johnson & Kindness PLLC

[57] ABSTRACT

A reconfigurable neural network is disclosed. The neural network includes a plurality of switches each having at least two conductive leads, wherein data flow direction of the conductive leads of the switches is programmed to select one of the conductive leads as input switch lead and select another one of the conductive leads as an output switch lead. A plurality of processing elements each having a plurality of leads connected to the switches, wherein the processing elements and the switches are interconnected in one-dimension manner. Each of the processing elements comprising: (a) a serial-in-parallel-out accumulator having a first input coupled to one of the interconnected switches and generating a first output; (b) an activation function for transforming the first output of the serial-in-parallel-out accumulator and generating a second output; and (c) a parallel-in-serial-out shift register for shifting out the second output of the activation function serially to one of the interconnected switches.

11 Claims, 4 Drawing Sheets

RECONFIGURABLE NEURAL NETWORK

CROSS REFERENCE TO RELATED APPLICATIONS

This invention is related to co-filed U.S. patent application Ser. No. TSAI19549 entitled "A Reconfigurable Neural Network And Difference-Square Type Neuron" assigned to same assignee as the present application and incorporated herein by reference in its entirety.

FIELD OF THE INVENTION

The present invention relates to a neural network, and more particularly to a reconfigurable neural network including weighted-sum type neurons.

BACKGROUND

An artificial neural network (ANN) is composed of many processing elements (PEs), typically referred to as neurons. FIG. 1 is a block diagram illustrating an artificial neural network 2 having three layers of neurons, i.e., an input layer 10, a hidden layer 1 and an output layer 14. Each neuron typically is responsive to stimuli received through one or more weighted input lines commonly known as synapses. For example, the neuron 16 in the hidden layer 1 is responsive to a single input signal received from a synapse 18. In general, the output lines of the neurons are further coupled to the synapses of other neurons, except, of course, the output lines of the neurons in the output layer. The terms "input" and "output" are used herein to refer to input and output signals, respectively.

FIG. 2 shows a typical neuron model wherein some input signals $x_1, x_2, \ldots$ and $x_N$ are simultaneously applied to the neuron 20 and processed by corresponding synaptic weights $w_{i1}, w_{i2}, \ldots$ and $w_{iN}$. The weighted inputs are then summed up and processed through a function $S(*)$, resulting in an output signal $Y_i$. The function $S(*)$, typically referred to as activation, is usually a nonlinear function such as, for example, a sigmoid function, a Gaussian function, a square function or a step function, depending on the application the artificial neural network is used.

Artificial neural networks may be classified into four categories according to the artificial neural network's learning encoding type and decoding structure. The four categories are: (i) feedforward supervised learning network, (ii) feedback supervised learning network, (iii) feedforward unsupervised learning network and (iv) feedback unsupervised learning network. TABLE 1 organizes several traditional artificial neural networks into the appropriate one of these four categories. In the feedforward supervised learning network category are, for example, multiple layer perceptron (MLP), ADALINE and MADALINE, which are frequently used for efficiently approximating a real system or realizing a solution for classification problem, provided that the numbers of neurons and network layers are sufficiently large.

TABLE 1

| DECODING | |
|---|---|
| FEEDFORWARD | FEEDBACK |
| ENCODING SUPERVISED | |
| Gradient Descent | RECURRENT BACKPROPAGATION |
| ADALINE | MADALINE III |
| MADALINE | |
| restricted coulomb energy network (RCE) | |
| radical-basis-function network (RBF) | |
| reinforcement learning | |
| Multiple Layer Perception (MLP) | |
| UNSUPERVISED | |
| VECTOR QUANTIZATION | RABAM |
| winner-take-all network (WTA) | BROWNIAN ANNEALING |
| self organizing maps | BOLTZMAN LEARNING |
| competitive learning | ABAM |
| counter-propagation | ART-2 |
| | BAM-COHEN-GROSSBERG MODEL |
| | HOPFIELD circuit |
| | BRAIN-STATE-IN-A-BOX |
| | MASKING FIELD |
| | ADAPTIVE RESONANCE |
| | ART-1 |
| | ART-2 |

A weighted-sum type process is used in the aforementioned artificial neural network 2. For a neuron i having N inputs, the resultant output $Y_i$ may be expressed in a compact form as follows:

$$Y_i = S\left(\sum_{j=1}^{N} (W_{ij} \cdot X_j)\right)$$

where:
$w_{ij}$ is the corresponding synaptic weight of input $x_j$ and S is the activation function.

This weighted-sum type neuron is typically realized through a multiplier for multiplying the input $x_j$ by the corresponding weight $w_{ij}$ and an adder for summing up the weighted input $(W_{ij} \cdot X_j)$, followed by a nonlinear circuit for generating the output signal $Y_i$.

Artificial neural networks can be further classified into three types of networks depending on what structure is used and how the artificial neural networks are implemented in analog or digital technologies. A first type of neural network utilizes a general digital processor such as a microprocessor, a digital signal processor or a floating point processor for implementing a one-dimension or multi-dimension array to simulate an artificial neural network. U.S. Pat. No. 5,204,938 entitled "Method Of Implementing A Neural Network On A Digital Computer" by David M. Skapura et al. discloses a neural network constructed by tailoring a digital computer architecture. Several processors each have a local memory for storing weights and connectivity information corresponding to neurons of the neural network. A global memory collects and broadcasts the intermediate output values from and to the processors via a data bus. Due to the time needed to shuttling the data back and forth among the processors, the local memories and the global memory, the process speed is only a few hundred kilo-connections per second.

A second type of neural network is composed of a large number of multipliers interconnected like a switchboard, and is typically implemented using analog techniques. For example, U.S. Pat. No. 5,087,826 entitled "Multi-Layer Neural Network Employing Multiplexed Output Neurons" and U.S. Pat. No. 5,256,911 entitled "Neural Network With Multiplexes Synaptic Processing" disclosed such a neural network. Despite its reconfiguring capability, high scalability and high process speed (up to several giga-connections per second), this type of structure has an inherent disadvantage because costly analog-to-digital (A/D) and digital-to-analog (D/A) converters are used. Consequently, the second type of artificial neural network is relatively expensive to implement.

Further, the second type of artificial neural network generally has a large external pin count due to the analog technology used therein. A large number of external pins is required primarily because this type of neural network physically maps a multiplier for each synapse. Therefore, this type of artificial neural network requires a dedicated input terminal for each synapse and interconnection coupled therebetween. For example, the pin count of this type of analog artificial neural network having 256 neurons may reach an unacceptably large number of more than 300 pins. Hence, the analog types of neural networks generally have relatively fewer of neurons due to the limited number of external pins available on the integrated circuit(s) implementing the artificial neural network.

The third type of artificial neural network is constructed mainly from a digital circuit as disclosed in U.S. Pat. No. 5,091,864 entitled "Systolic Processor Elements For A Neural Network". This type of artificial neural network uses the digital circuit in an attempt to keep costs down without compromising the speed using a one-dimension structure such as pipeline architecture. Another example of this type of artificial neural network is disclosed by Wawrzynek et al. in "The Design of a Neuro-Microprocessor," IEEE Trans. on Neural Networks, vol. 4, No. 3, May 1993, pp. 394–399. Wawryznek refers to the disclosed digital neural network as the "SPERT" network. The disclosed SPERT network calculates eight weighted sums concurrently using 8 neurons, in which the 8-bit input $X_j$ is broadcasted serially and the 16-bit synaptic weight is read in parallel through eight ports.

Most digital artificial networks work in a bit-parallel input/output (I/O) manner and, therefore, causing the network to have global I/O ports that increase the complexity of implementing the network. Moreover, due to the limitations of current semiconductor fabrication techniques, the number of neurons that can be formed on a single chip is limited. However, most neural networks for practical applications generally require more neurons than can be practically implemented on a single chip. Therefore, a convenient partitionable and scalable architecture is needed to overcome the physical constraints imposed on the semiconductor chip.

Further, in a conventional digital neural network, the parallel I/O increases complexity and area usage, which increases cost. For example, in a conventional digital neural network having an output port of a layer with J neurons connected to the input port of an adjacent layer having K neurons, the total number of switches of the crossbar switch required to connect the ports reaches the product J·K·b, where b is the word width in bits of the I/O port. Thus, the number of switches becomes impractically high as the number of neurons in the artificial neural network increases.

Furthermore, the I/O bandwidth of input $X_j$ is less than the I/O bandwidth of synaptic weight $W_{ij}$ (i.e., the intra-neuron bandwidth) because of iterative use of the input $X_j$ in summing up the weighted inputs. More specifically, the weighted-sum expression for each neuron can be denoted as follows:

$$\sum_{j=1}^{N} W_{ij} \cdot X_j, i = 1, 2, \ldots, I$$

where I is the number of neurons.

A neuron cannot receive the next input $(X_{j+1})$ until it completes calculating the weighted-sum expression. Accordingly, the rate at which a neuron receives the input $X_j$ is less than the rate at which neuron receives the synaptic weight $W_{ij}$. As a result, the timing of this type of neural network is relatively more complex. Therefore, a need has arisen for a new artificial neural network with minimized I/O bandwidth of neurons and a decreased number of switches for subneural network interconnection. Also, a new neural network architecture is needed for reducing the impact of physical constraints, such as the limited pin count, imposed by the semiconductor chip. Still further, there is a need for easily reconfiguring the topology of an artificial neural network.

SUMMARY

In accordance with the present invention, a reconfigurable neural network is disclosed. In one embodiment, the reconfigurable neural network includes a plurality of switches each having at least two conductive leads. The switches are programmed so that the data flow direction of the conductive leads of the switches can be selected. More specifically, each switch can be programmed so that one of the conductive leads is an input switch lead and another one of the conductive leads is an output switch lead. The reconfigurable neural network also includes a plurality of processing elements interconnected through the plurality of switches in a one dimensional manner. The neural network is reconfigured by reprogramming the data flow direction of the switches.

According to another aspect of the present invention, the reconfigurable neural network includes a plurality of serial-in-serial-out processing elements, each having a plurality of leads connected to the switches. Each of the processing elements includes (a) a serial-in-parallel-out accumulator coupled to one of the switches for calculating a weighted sum of inputs; (b) an activation function circuit coupled to an output lead of the accumulator for generating a neuron output signal; and (c) a parallel-in-serial-out shift register coupled to the activation function circuit for providing the neuron output signal serially to another of the interconnected switches.

One embodiment of the aforementioned serial-in-parallel-out accumulator includes (a) a memory for storing weights; (b) several AND gates each having a first gate input coupled to a first input lead of the serial-in-parallel-out accumulator and a second gate input lead coupled to one bit of the memory; (c) an adder having a first operand input lead coupled to receive the resultant output signals of the AND gates; and (d) a shifter for processing the output of the adder. The output lead of the shifter is coupled to a second operand input lead of the adder and to the input lead of the activation function circuit.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 1:
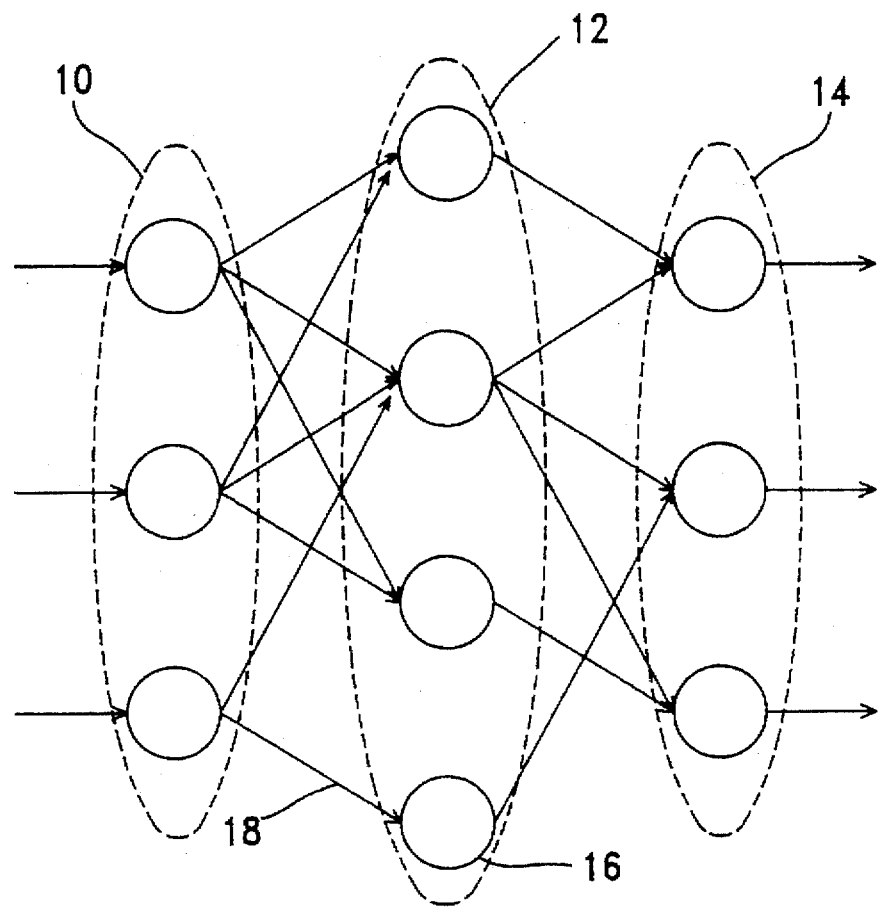
FIG. 1 shows a block diagram of an exemplary conventional artificial neural network.
Figure 2:
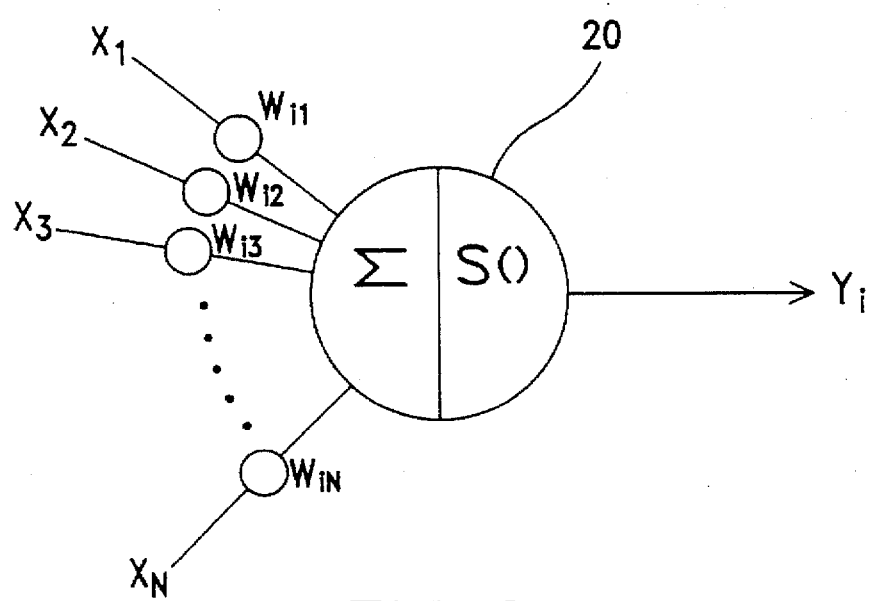
FIG. 2 shows a block diagram illustrating a typical neuron model.
Figure 3:
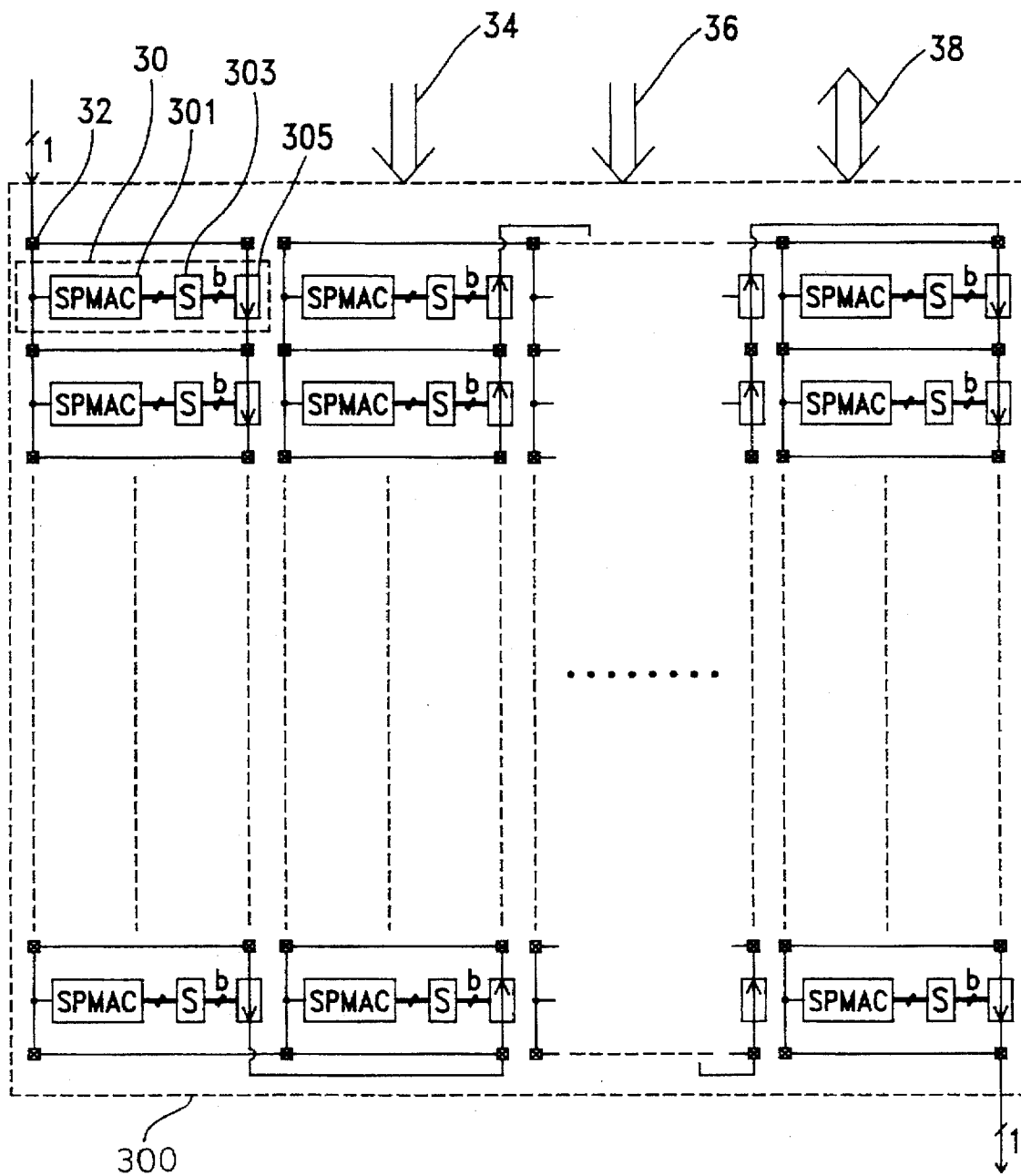
FIG. 3 shows a block diagram illustrating the structure of a neural network according to one embodiment of the present invention.

FIG. 3 shows an artificial neural network circuit 300 according to one embodiment of the present invention. The artificial neural network circuit 300 includes several substantially identical processing elements (PEs) 30 with bit-serial input lead 31 and bit-serial output lead 33. These PEs 30, also referred to as neurons, are interconnected in a one-dimension array structure via switch boxes 32. Each switch box 32 has two or three leads, and is programmable to control one of its leads as input lead and another one as output lead. Any suitable method of programming the switches may be used such as, for example, electrical control signals from a memory, register fuse or antifuse. As a result, the neural network 300 has a smaller, simpler switching scheme capable of reconfiguring the network, compared to conventional artificial neural networks having parallel switching schemes.

In this embodiment, each PE 30 includes a serial-in-parallel-out multiply and accumulate circuit (SPMAC) 301. Each SPMAC 301 receives data broadcasted from the bit-serial input lead 31, and is capable of summing up the weighted input according to the equation below:

$$\sum_{j=1}^{N} W_{ij} \cdot X_j, i = 1, 2, \ldots, I$$

where I is the number of neurons in a layer.

The SPMAC is described further below in conjunction with FIG. 5. The weighted-sum output from the SPMAC is then processed through an activation function circuit 303, which applies a nonlinear function to the weighted-sum output. Typical nonlinear function include, for example, a sigmoid function, a Gaussian function, a square function or a step function. In this embodiment, the activation function circuit 303 receives parallel weighted sum data from the SPMAC and applies the activation function, generating a parallel output. The parallel output from the activation function circuit 303 is then loaded into a parallel-in-serial-out shift register 305, which transfers the processed data in a serial format to the output lead 33. This serial output is then broadcasted through other shift registers 305 to the following layer. The artificial neural network 300 further includes a control bus 34, an address bus 36 and a data bus 38 for receiving synaptic weights from an outside controller (not shown). In this embodiment, the outside controller loads the synaptic weights in parallel into a memory (described below in conjunction with FIG. 5) of each SPMAC by providing a load command on the control bus 34 with the desired synaptic weights on the data bus 38 with the corresponding address on the address bus 36.

Figure 4A:
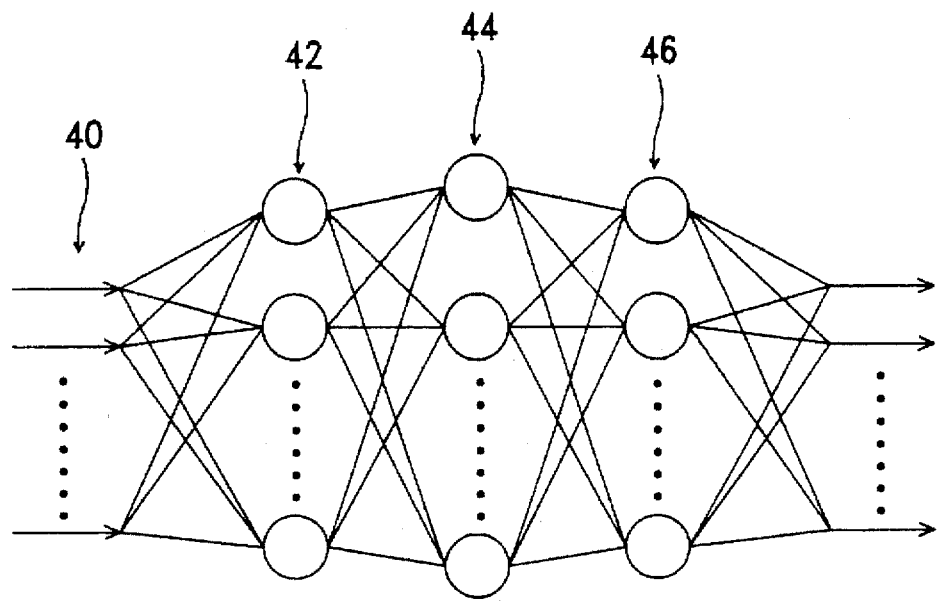
FIG. 4A shows a block diagram of an exemplary of a general three-layer artificial neural network.
Figure 4B:
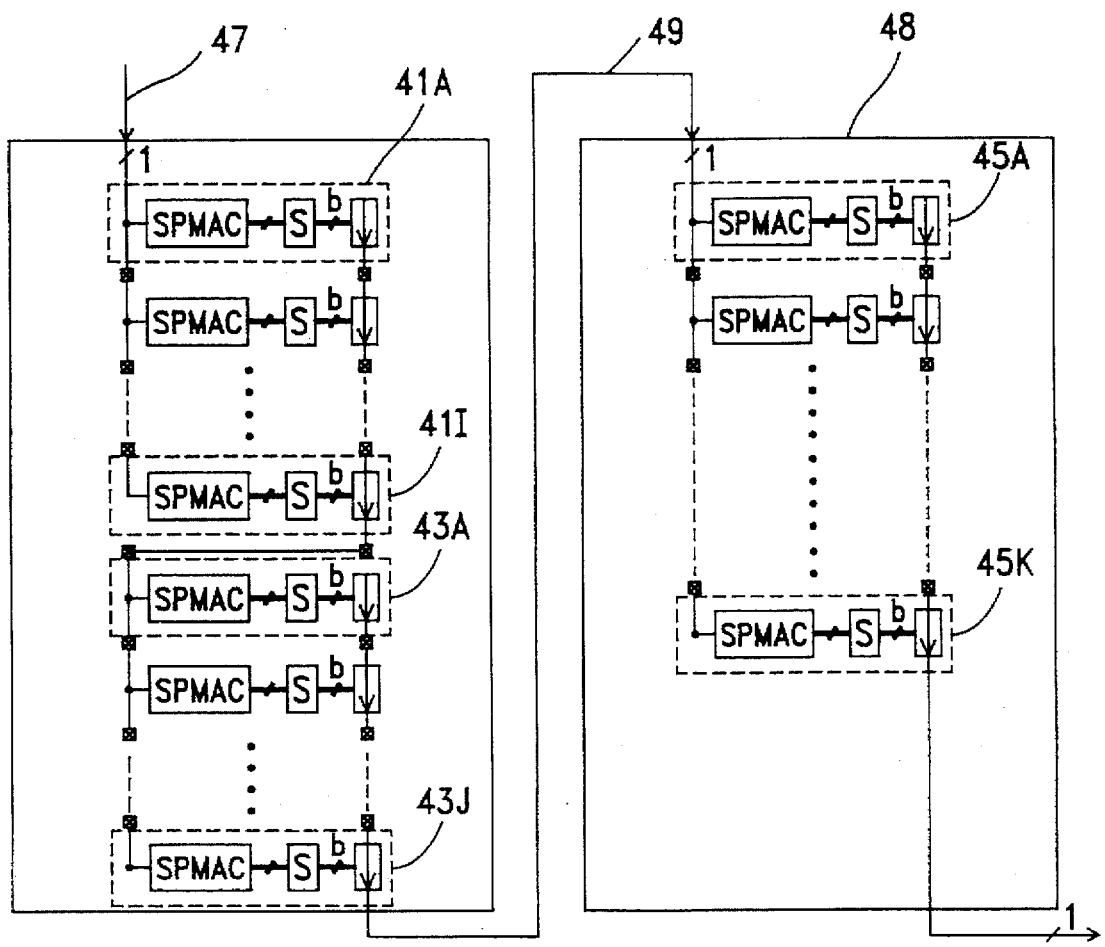
FIG. 4B shows a block diagram illustrating an embodiment of a mapped neural network of the present invention implementing the artificial neural network of FIG. 4A.

Reconfiguring the network includes changing the number of neurons in a layer or changing the number of layers. Referring now to FIG. 4A, an exemplary neural network is shown having an input layer 40 with H inputs, a first hidden layer 42 with I neurons, a second hidden layer 44 with J neurons and an output layer 46 with K neurons. This topology can be implemented in the artificial neural network 300 (FIG. 3), as shown in FIG. 4B. For clarity, the unused switch boxes and interconnected leads are not shown.

Referring now to FIGS. 4A and 4B, the processing elements 41A to 41I correspond to the I neurons in the first hidden layer 42, the processing elements 43A to 43J correspond to the J neurons of the second hidden layer 44, and the PEs 45A to 45K correspond to the K neurons of the output layer 46. Data is input to the input layer 40 from the bit-serial input lead 47 and is broadcasted to the PEs 41A-41I. The switch boxes are configured so that PEs 41A-41I receive the serial data in parallel. The PEs 41A-41I then operate on the input data as described above in conjunction with FIG. 3. Thereafter, the processed data from each of the PEs 41A-41I are shifted out serially to the next layer, i.e., the second hidden layer 44. More specifically, the switch boxes are configured so that the shift registers of the PEs 41A-41I are connected in series, forming, in effect, a single shift register. The switch box connected to the output lead of the shift register of the PE 41I is then connected to the second hidden layer 44. The switch boxes connected to the input leads of the PEs 43A-43J of the second layer 44 so that the output of the shift register of PE 41I is provided globally to the PEs 43A-43J. Noticeably, the processed data out of the second hidden layer is transmitted via an interconnected conductor 49 to another portion of the artificial neural network 48, which includes the K PEs 45A-45K and several programmed switch boxes.

The topology partition memioned above can be accomplished quite easily by only a bit-wise connector 49 in our invention. For example, if a chip can only accommodate about (I+J) neurons, i.e., the total neurons of the first hidden layer 42 and the second hidden layer 44 (FIG. 4A), the K neurons of the output layer 46 are therefore placed on another chip 48 (FIG. 4B). The output bit from the second hidden layer is connected to the chip 48 via a single bit connector 49.

Continuing with the example of FIG. 4A, suppose that the resolution of the neural network is b bits, it takes (H x b) clock cycles for receiving all inputs by the first hidden layer 42. Further, (I x b) clock cycles are required for outputting the results from the first hidden layer 42 to the second hidden layer 44, and (J x b) clock cycles are needed for outputting the results from the second hidden layer 42 to the output layer 46. Moreover, (k x b) clock cycles are required to shift the final results from the output layer 46.

Figure 5:
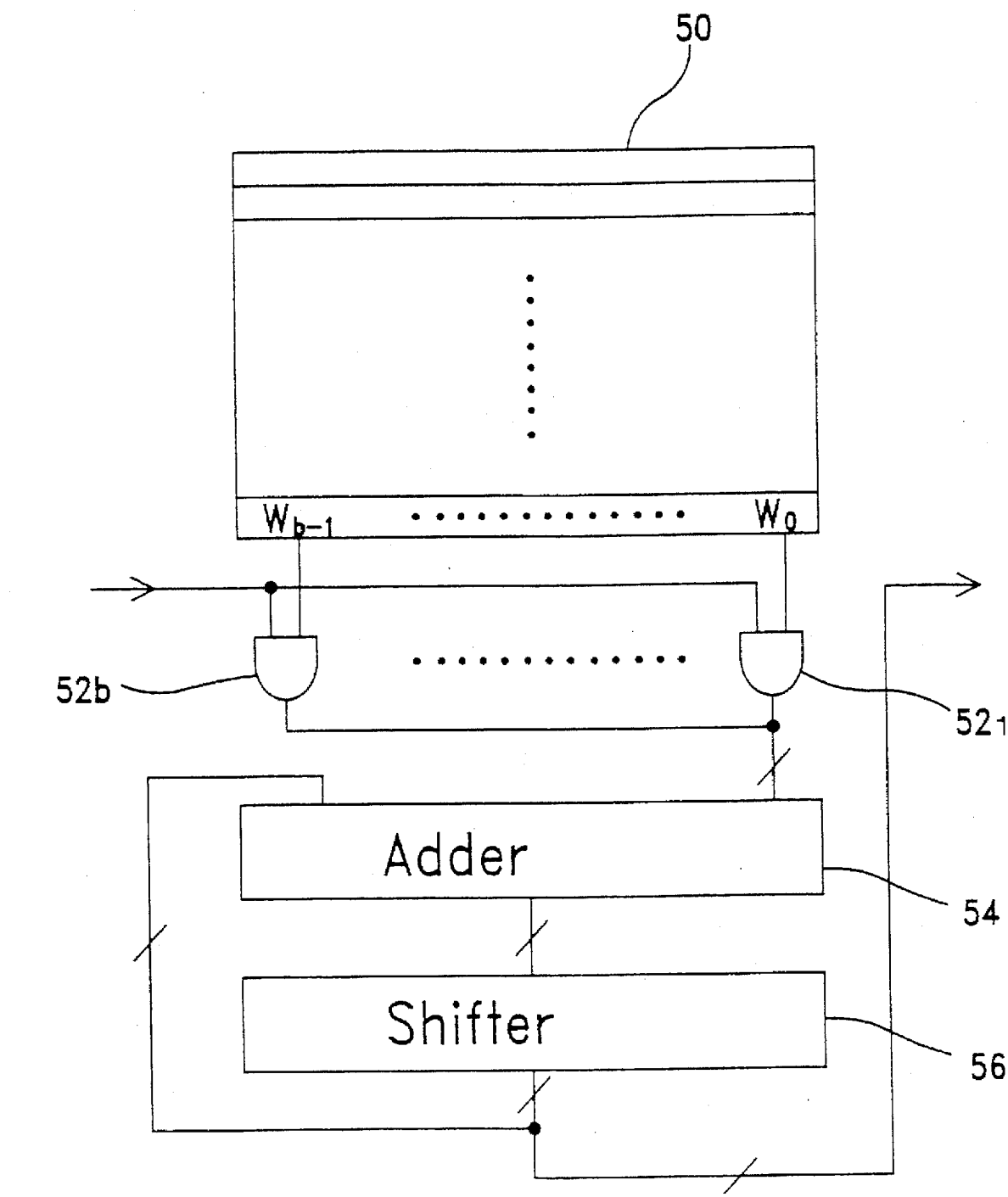
FIG. 5 shows a block diagram of one embodiment of a serial-in-parallel-out multiply and accumulate circuit (SPMAC) according to the present invention.

FIG. 5 shows a block diagram of one embodiment of a SPMAC having a storage area 50, an AND gate array 52, an adder 54 and a shifter 56. The storage area 50 stores the synaptic weights $W_{ij}$ for weighting the inputs $X_j$. The storage area 50 can be implemented with any suitable storage device such as, for example, a dynamic random access memory (DRAM), a static RAM or electrically erasable programmable read only memory (EEPROM). The synaptic weights are read out of the storage area 50 in word width b and inputted to a corresponding AND gate of the array of AND gates 52. As is well known, binary multiplication can be implemented with AND gates. Thus, the array of AND gates 52 serves as a multiplier that multiplies the bits of the synaptic weight with each bit of the input signal $X_j$. For example, the binary multiplication of a 3-bit weight with a 3-bit input is:

$$
\begin{array}{r}
2^2(x_1w_3) + \quad 2^1(x_2w_2) + \quad 2^0(x_1w_1) \\
2^3(x_2w_3) + \quad 2^2(x_2w_2) + \quad 2^1(x_2w_1) \\
+ \underline{2^4(x_3w_3) + \quad 2^3(x_3w_2) + \quad 2^2(x_3w_1)}
\end{array}
$$

In this embodiment, the AND gate array 52 includes two-input AND gates $52_1$-$52_b$, corresponding to bits $w_1$-$w_b$ of the synaptic weight $W_{ij}$.

The SPMAC operates as follows. Initially, the shifter 56 is reset, and thus contains zeros. The AND gate $52_1$, corresponding to the least significant bit, provides its output to the input lead of the adder 54 during a clock cycle N. The adder 54 then adds zero to the output of AND gate $52_1$, and outputs the sum (i.e., $x_1w_1$) to the shifter 56. Then during clock cycle N+1, the shifter 56 shifts its contents one bit to the right and the adder 54 receives the output of the AND gate $52_2$ (i.e., $x_1w_2$). The adder 54 then adds zero to $x_1w_2$ and then stores $x_1w_2$ in the next significant bit of the shifter 56. This process is repeated for a total of b clock cycles, so that the output of all the AND gates is received by the adder 54. For b=3, the shifter contains the values $(x_1w_3)$, $(x_1w_2)$, $(x_1w_1)$ in its three least significant bits, respectively.

Then the shifter 56 shifts its contents to the left b-1 bits to properly align the multiplication of the weight with the next bit $x_2$ of the input $X_j$, corresponding to the second row in the expression above. The AND gate $52_1$ outputs $x_2w_1$ to the input lead of the adder 54, which then adds $x_1w_2$, and outputs the sum (i.e., $x_2w_1+x_1w_2$) to the shifter 56. During the next clock cycle, the shifter 56 shifts its contents to the right one bit and receives from the adder 54 the sum $(x_2w_2+x_1w_3)$. This process is repeated for a total of b clock cycles, so that the output of all the AND gates is received by the adder 54. The shifter 56 then shifts its contents to the left b-1 bits to properly align the multiplication of the weight with the next bit $x_3$ of the input $X_j$, corresponding to the third row in the expression above. The process is repeated the process for the next bit of the input $X_j$. The shifter 56 is then reset for the next input signal $X_{j+1}$ and the process is repeated. This overall process is then repeated until all of the bits of all of the inputs $X_j$ have been processed, whereby the shifter 56 contains the sum:

$$\sum_{j=1}^{N} W_{ij} \cdot X_j, i=1,2,\ldots,I$$

The shifter 56 then provides its contents in parallel to the activation function circuit 303. In this embodiment, the activation function circuit 303 (FIG. 3) is implemented with a previously down-loaded look-up device such as a read only memory (ROM) look-up table. Of course, any suitable circuit for generating the activation function can be used. The activation function circuit 303 operates on the data from the shifter 56 with the activation function, and provides result in parallel to the parallel-in-serial-out register 305 (FIG. 3), which provides the processed data serially to the output lead of the PE 30.

Although specific embodiment has been illustrated and described, it will be obvious to those skilled in the art that various modifications may be made without departing from the spirit which is intended to be limited solely by the appended claims.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A neural network circuit, comprising:

first switching means having a first lead, a second lead and a third lead;

second switching means having a first lead, a second lead and a third lead, said second lead of said second switching means coupled to said second lead of said first switching means;

a first processing element (PE) having a first input lead, a second input lead and an output lead, said first input lead of said first PE coupled to said third lead of said first switching means, said second input lead coupled to said third lead of said second switching means, wherein said first PE outputting at said output lead of said first PE a serial digital output signal that is weighted sum function of a first serial digital input signal received at said first input lead of said first PE;

third switching means having a first lead, a second lead and a third lead, said first lead of said third switching means coupled to said first input lead of said first PE;

fourth switching means having a first lead, a second lead, and a third lead, said first lead of said fourth switching means coupled to said output lead of said first PE, said second lead of said fourth switching means coupled to said second lead of said third switching means; and a second PE having a first input lead, a second input lead and an output lead, said first input lead coupled to said third lead of said fourth switching means, said second input lead of said second PE coupled to said third lead of said fourth switching means, wherein said second PE outputting at said output lead of said second PE a serial digital output signal that is a weighted sum function of a serial digital input signal received at said first input lead of said second PE, wherein:

said first switching means being selectably configured to provide a signal received on said first lead of said first switching means to said first input lead of said first PE or a signal received from said second lead of said second switching means to said first input lead of said first PE, said second switching means being selectably configured to provide a signal received on said first lead of said second switching means to said second input lead of said first PE or to said second lead of said first switching means, said third switching means being selectably configured to provide a signal received from said third lead of said first switching means to said first input lead of said second PE or a signal received from said second lead of said fourth switching means to said first input lead of said second PE, and said fourth switching means being selectably configured to provide a signal received from said output lead of said first PE to said second lead of said fourth switching means or to said second input lead of said second PE.

2. The neural network circuit of claim 1 wherein said first PE calculates a weight sum accumulation of serial digital input signals received at said first input lead of said first PE.

3. The neural network circuit of claim 2 wherein said first PE outputs at said output lead of said first PE a serial digital output signal dependent on a serial digital signal received at said second input lead of said first PE.

4. The neural network circuit of claim 3 wherein said first PE comprises a shift register, wherein said shift register stores serial digital input signal received at said second input lead of said first PE and serially outputting said stored serial digital input signal on said output lead of said first PE.

5. The neural network circuit of claim 4 wherein said shift register being loaded in parallel with said weighted sum accumulation and serially outputting said weight sum accumulation on said output lead of said first PE.

6. The neural network circuit of claim 5 wherein said first PE and said second PE can be selectable grouped into a layer of a neural network by configuring:

said third switching means to electrically connect said first input lead of said first PE to said first input lead of said second PE; and said fourth switching means to electrically connect said output lead of said first PE to said second input lead of said second PE.

7. The neural network circuit of claim 5 wherein said first PE and said second PE can be selectably grouped into separate layers of a neural network by configuring said third switching means and said fourth switching means to electrically connect said output lead of said first PE to said first input lead of said second PE.

8. The neural network circuit of claim 5 wherein said first PE further comprises:

a serial-in-parallel-out multiply and accumulate circuit (SPMAC) having an input lead coupled to said input lead of said first PE; and an activation circuit having an input port coupled to an output port of said SPMAC and an input port of said shift register, wherein said activation circuit operating on an output signal from said SPMAC with an activation function.

9. The neural network circuit of claim 8, wherein said activation circuit comprises a previously down-loaded look-up table.

10. The neural network circuit of claim 8 wherein said SPMAC comprises:

a storage area coupled to said SPMAC, wherein said storage area storing weights for weighting an input signal received at said input lead of said SPMAC;

a multiply circuit coupled to said storage area and said input lead of said SPMAC;

and adder coupled having a first input lead coupled to an output lead of said multiply circuit; and a shifter having an input lead coupled to an output lead of said adder and having an output lead coupled to a second input lead of said adder.

11. The neural network circuit of claim 8 wherein said storage area comprises a random access memory.

* * * * *